United States Patent
McCall

(10) Patent No.: US 9,668,035 B2
(45) Date of Patent: May 30, 2017

(54) MICROELECTROMECHANICAL RATE SENSOR

(71) Applicant: ROSEMOUNT AEROSPACE, INC., Burnsville, MN (US)

(72) Inventor: Hiram McCall, Woodland Hills, CA (US)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 102 days.

(21) Appl. No.: 14/256,329

(22) Filed: Apr. 18, 2014

(65) Prior Publication Data

US 2015/0304741 A1 Oct. 22, 2015

(51) Int. Cl.
*G08C 19/16* (2006.01)
*H04Q 9/14* (2006.01)
*G01C 19/5776* (2012.01)

(52) U.S. Cl.
CPC ........... *H04Q 9/14* (2013.01); *G01C 19/5776* (2013.01)

(58) Field of Classification Search
CPC ............ G01S 1/02; G01S 1/68; G01S 5/0009; H03M 1/00; H03M 2201/4225; H03M 2201/4233
USPC ............... 340/870.11, 870.21; 342/386, 464; 341/155; 73/1.77, 1.76; 74/5.34, 5.4, 74/5.47, 5.8, 5.9
See application file for complete search history.

(56) References Cited

U.S. PATENT DOCUMENTS

| | | | | |
|---|---|---|---|---|
| 511,163 | A * | 12/1893 | Erlich | B61B 12/06 104/179 |
| 3,328,794 | A * | 6/1967 | Baltzer | F41G 7/2246 244/3.13 |
| 2004/0174832 | A1* | 9/2004 | Geiger | G01C 19/5776 370/295 |
| 2007/0180908 | A1* | 8/2007 | Seeger | G01C 19/5719 73/504.12 |
| 2008/0088507 | A1* | 4/2008 | Smith | G01C 21/165 342/386 |
| 2011/0192226 | A1* | 8/2011 | Hayner | G01C 19/5776 73/504.12 |
| 2011/0283793 | A1 | 11/2011 | Itakura | |
| 2012/0154031 | A1* | 6/2012 | Zuckerman | H03L 7/185 327/551 |

(Continued)

FOREIGN PATENT DOCUMENTS

EP 2060871 5/2009

OTHER PUBLICATIONS

Partial European Search Report dated Sep. 2, 2015 in European Application No. 15164022.4.

(Continued)

*Primary Examiner* — George Bugg
*Assistant Examiner* — Anthony D Afrifa-Kyei
(74) *Attorney, Agent, or Firm* — Snell & Wilmer L.L.P.

(57) ABSTRACT

A high signal to noise ratio circuit and signal processing scheme described herein provides signal power above a noise floor such that high performance rate gyro operation can be achieved. The technology described herein exploits the combination of very low noise rate signal front end and a carrier frequency locked to a crystal filter's passband. A fixed single frequency and a sampled alternating current amplitude for conveyance of rate information is utilized.

11 Claims, 5 Drawing Sheets

(56) References Cited

U.S. PATENT DOCUMENTS

2013/0111990 A1    5/2013   Wang et al.
2013/0300460 A1    11/2013   Gabbay

OTHER PUBLICATIONS

Extended European Search Report dated Feb. 11, 2016 in European Application No. 15164022.4.

\* cited by examiner

MICROELECTROMECHANICAL RATE SENSOR

FIELD

The present disclosure relates to an inertial angular rate sensor, and specifically to a silicon-based navigational-grade inertial angular rate sensor.

BACKGROUND

Rate grade and tactical grade silicon inertial angular rate sensors are typically constructed with sensing elements that consist of a suspended silicon resonator excited by an electrostatic motor to produce angular momentum. FIG. 1 illustrates a typical electronic circuit 100 configured to sense a capacitance value and convert the capacitance value to a voltage proportional to the input rate. The electronic circuit 100 may comprise a microstructure 110 in communication with a rate summer 120, where the rate signal is amplified by a charge amplifier 130. The electronic circuit 100 may further comprise a demodulator that receives a signal from the charge amplifier 130 and sends a demodulated signal to a quadrature reduction circuit 150. When the electronic circuit 100 is subjected to an input angular rate, the need to change the angular momentum forces a displacement to occur along a sense axis that is measured through the change in an integral capacitor of microstructure 110. By controlling the motor amplitude, the angular momentum is held constant, which produces a linear displacement when subjected to an angular rate along the input axis.

Angular momentum may be produced in a silicon resonator when a suspended mass is in motion. When an electrostatic motor is used to produce this motion, the resulting angular momentum is at maximum when the angular velocity is at a maximum and the motor displacement is at a minimum. Rate sensing occurs when angular momentum is at a maximum which corresponds to a 0° phase lead relative to the motor displacement. This may be referred to as the in phase component of the total rate signal AC waveform and is typically very small compared to the overall rate signal. The other component of the total rate signal is the quadrature component, which should be minimized in order to allow for greater signal to noise ratios in the in phase signal. The rate signal may be extracted from the in phase signal by down converting or demodulating the rate signal using the motor displacement signal as the phase reference.

Moreover, rate grade and tactical grade silicon inertial angular rate sensors are typically subject to many error sources which limit performance and may make it difficult to use for high accuracy applications. These include large total rate signal relative to the in phase signal, electronic noise in the interfacing electronics, resolution of the A/D converter, phase jitter in the demodulator, phase jitter in the motor frequency, motor drive signal coupling into the rate signal, nonlinearity of the restoring forces, and hysteresis from die mounting stress.

In contrast, a navigation-grade rate sensor provides signal power far above the noise floor such that low noise and navigation grade bias stability can be achieved. A navigation-grade rate sensor (gyro) may be a Hemispherical Resonator Gyro (HRG), and quartz-based for accuracy. However, a HRG is typically more expensive, fragile, and larger than a rate or tactical grade silicon inertial angular rate sensor. Further, a HRG uses a resonant frequency that is temperature dependent and thus varies based on the microstructure temperature. The temperature variance is another aspect that may be compensated for in the prior art design, leading to additional complexity.

SUMMARY

In accordance with the preferred embodiment, a navigational-grade rate sensor system including a motor drive signal generator, a carrier signal generator, and a signal compensation signal generator is disclosed. The motor, carrier, and the signal compensation signal generators each provide signals to a first circuit. A second circuit provides signals to the first circuit. The second circuit is configured to generate system outputs and provide feedback signals to the motor drive signal generator, the carrier signal generator, and the signal compensation signal generator.

In accordance with the preferred embodiment, a Frequency Modulated (FM) discriminator circuit is described. The FM discriminator circuit may comprise a phase output, wherein the phase output of the FM discriminator circuit is compared to a phase reference signal. In response to the phase output of the FM discriminator circuit being less than the phase of the reference signal, a carrier frequency command to a Carrier Signal Generator is increased such that the phase output of the FM discriminator circuit tracks the phase reference. In response to the phase output of the FM discriminator circuit being greater than the phase reference signal, the frequency command to the carrier signal generator is increased such that the phase output of the FM discriminator circuit tracks the phase reference.

BRIEF DESCRIPTION OF THE DRAWING FIGURES

The subject matter of the present disclosure is specifically referenced and distinctly claimed in the concluding portion of the specification. A more complete understanding of the present disclosure, however, may best be obtained by referring to the detailed description and claims when considered in connection with the drawings and figures, wherein like numerals denote like elements.

DETAILED DESCRIPTION

Figure 1:
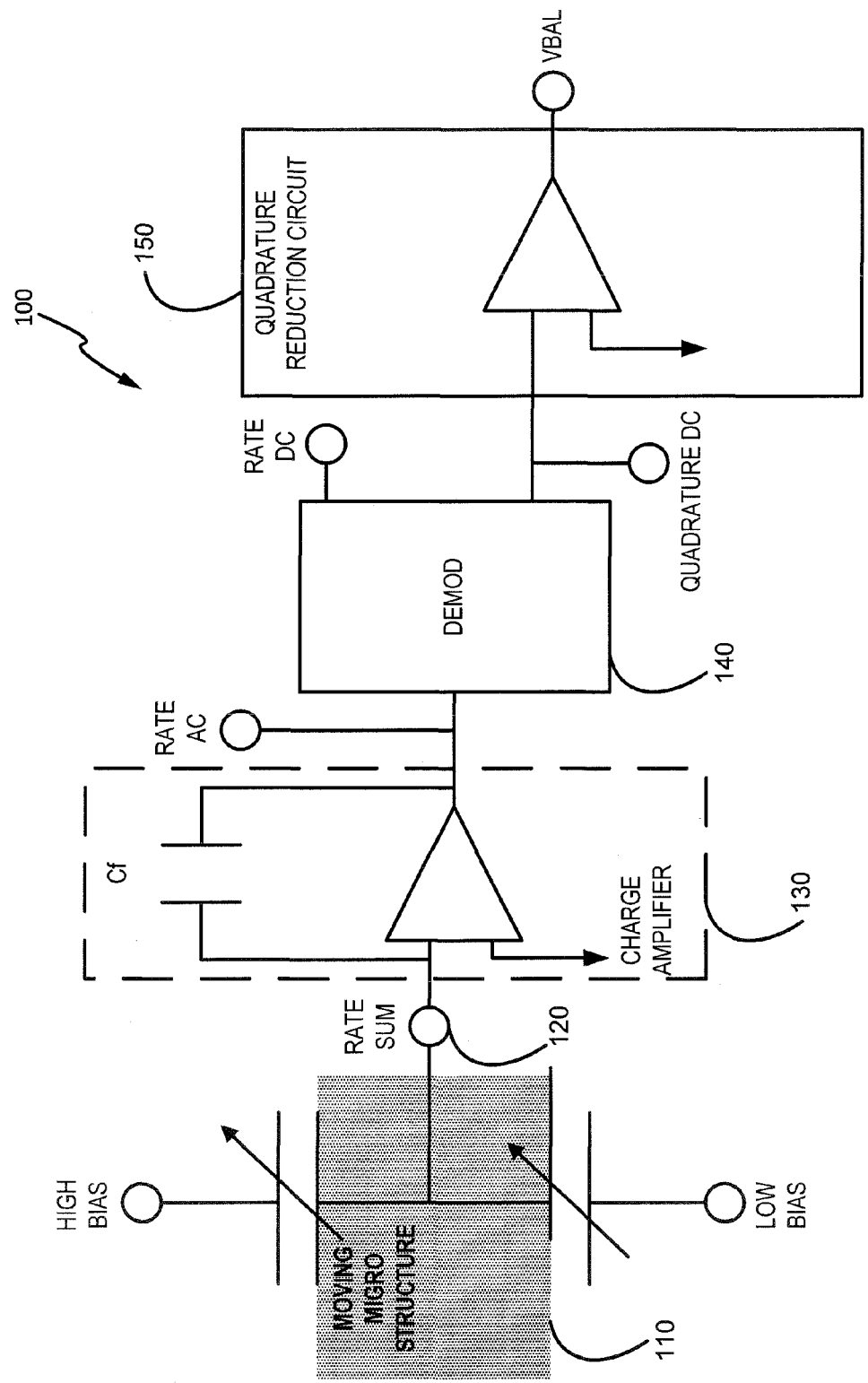
FIG. 1 illustrates a block diagram of a conventional circuit configured to sense a capacitance value and convert this to a voltage that is proportional to the input rate.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, electrical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent, removable, temporary, partial, full and/or any other possible attachment option. Additionally, any reference to without contact (or similar phrases) may also include reduced contact or minimal contact.

Rate gyros may be utilized for many applications requiring a wide range of performance. The most demanding uses known are for strategic inertial guidance systems and are labeled "strategic grade". Long time of flight unaided navigation systems need performance commonly labeled "navigation grade". Tactical grade gyros are useful for short time of unaided flight and longer time flights when fairly frequent updates are available. The least demanding applications are labeled "rate grade" and include performance needed for platform or device stabilization or isolation from angular rate disturbances.

Silicon Micro-Electro-Mechanical Systems (MEMS) rate sensors have previously provided rate grade and tactical grade performance. Similarly, solid state rate sensors may be available to provide navigation and even strategic grade performance for applications where the price and reliability can be supported by the need. A navigation grade silicon rate sensor results in a rugged and low power device, capable of exploiting the techniques developed by the semiconductor industry for low cost mass production.

According to various embodiments, the high signal to noise ratio circuit and signal processing scheme described herein provides signal power sufficiently above a noise floor such that high performance rate gyro operation can be achieved. The technology described herein exploits the combination of very low noise rate signal front end and a carrier frequency locked to a crystal filter's passband. According to various embodiments, a fixed single frequency and a sampled alternating current amplitude for conveyance of extracted rate information is utilized.

According to various embodiments and described in greater detail below, a rate signal utilizing gyro electronics configured for rate signal extraction may be transmitted through a carrier signal in a high frequency band where low noise content per Hertz is available. A current signal from the gyro die may be transformed into a voltage with a low noise transimpedance amplifier or a voltage from the gyro die may be buffered with a high input impedance amplifier and further amplified with a low noise fixed gain front end crystal bandpass filter followed by a differential amplifier. A transimpedance amplifier is a current to voltage converter; most often implemented using an operational amplifier. A differential amplifier is a type of electronic amplifier that amplifies the difference between two voltages but does not amplify the particular voltages.

Two analog gain stages may precede a high performance 24 bit synchronous sampling analog to digital (A/D) converter or an analog demodulator. The circuit may be configured to sample with 90 degree phase lag at twice the frequency of the rate carrier output frequency present at the A/D input. Sinusoidal waveforms may be utilized such that the errors that would otherwise be created by parasitic capacitors are reduced. Digital or analog signal processing of the in-phase, and quadrature portions of the rate signal, and components of the motor drive signal may result in commands to three separate Signal Generators one for motor drive, one for in-phase rate signal compensation, and one for the rate carrier signal. The large total rate signal relative to the in phase signal may be compensated by separating the quadrature data from the total data in the sampled rate data. An algorithm may be used to accurately estimate the magnitude of the quadrature signal, and in response to the magnitude of the quadrature signal being greater than zero, a command is sent to a signal generator to generate an in-phase signal with the same carrier frequency found at the output of the rate sensor die. The carrier excitation signal frequency may be adjusted with a closed loop so that the rate signal output remains within the bandwidth of the crystal bandpass filter.

According to various embodiments, though many materials are contemplated herein, the rate sensor die to rate sensor mount bonding materials may comprise metallic eutectic materials. The rate sensor die may comprise an all silicon suspension with a resonant frequency which is less than the motor or rate resonances. This design may eliminate bias hysteresis which would otherwise be present. For instance, this multiple layer of resonators combined with an all metallic silicon to mounting structure bond virtually eliminates bias hysteresis and provides isolation from acoustic and high frequency vibration disturbances.

The initially applied motor drive may be removed for short intervals at a periodic rate during rate signal extraction which allows the resonator to run free of any excitation in a high vacuum container, thus reducing rate noise and bias instability of the system. As long as the quality factor of the resonance is high enough, the attenuation of the displacement amplitude is negligible and allows rate signal sampling to occur without contamination resulting in increased signal to noise of the rate signal.

A high variable frequency carrier with a fixed amplitude sinusoidal excitation signal may be used. This design may lower noise in the rate signal. Stated another way, a high variable frequency with fixed amplitude sinusoidal excitation signal may be electrically coupled to a microelectromechanical system (MEMS) resonator where it becomes modulated by the motion of the resonator. The resulting signal may be electrically coupled to a low noise fixed bandwidth transimpedance amplifier.

The rate output of the transimpedance amplifier may be passed through a narrowband fixed bandwidth crystal amplifier resulting in very low noise in the rate signal. The output of the transimpedance amplifier is passed through a narrowband fixed bandwidth crystal amplifier and then passed into a buffer amplifier to drive a high speed analog to digital converter that can covert at no less than 2 mega samples/sec and into a frequency modulated discriminator circuit. The A/D converter may be a 24 bit converter. In the alternative the A/D converter may be a lesser resolution converter with a higher sampling rate. An alternate realization of the signal processing utilizes an analog demodulator to extract the carrier rate amplitude.

The phase output of the frequency modulated discriminator circuit may be compared to a phase reference and if found to be less than the reference, the carrier frequency command to a carrier signal generator is increased such that the phase tracks the phase reference. This enables the use of a crystal band pass filter resulting in lower rate noise. The motor drive signal generator may use a commanded frequency input that may be different from the motor resonance, but is locked to a precision crystal time base eliminating phase jitter and lowering the bias instability. The frequency modulated discriminator output is used as the feedback to adjust the commanded motor drive frequency such that the motor synthesized frequency remains locked to the motor resonant frequency. For instance, in response to the phase output being greater than the phase reference, the frequency command to the motor drive signal generator is increased such that the phase tracks the phase reference. In this way, motor drive voltage is minimized and the motor coupling into the rate signal lowers gyro bias instability. The circuit that drives the re-torqueing plates may place an exact and repeatable charge on the restoring plates in-phase with motor displacement and create effects that are not a function of the plate separation distance resulting in lower bias instability. The torquer plate separation distance is known from the rate pickoff data and is utilized to provide compensation for the effects of parasitic capacitances thus lowering the gyro bias instability. The rate signal output may be recovered from a combination of the carrier rate amplitude, the motor resonant frequency, and the nominal carrier frequency for a higher signal to noise ratio rate signal and lower gyro bias instability. One common voltage reference may be used for amplitude of the carrier signal, motor drive, signal generator amplitude reference, and any A/D references, which results in lower bias instability. The motor drive may be sinusoidal and may be provided by a motor drive signal generator. This design may lower the gyro bias instability. The in-phase component of the rate signal may be compensated by separating the in-phase data from the total data in the rate data. An algorithm, further discussed below, may accurately estimate the magnitude of the in-phase signal. In response to the magnitude of the in-phase signal being greater than zero, a signal generator may be commanded to generate an in-phase signal with the same carrier frequency found at the output of the rate sensor die. This compensation signal estimate may be subtracted from the total rate signal with an analog circuit increasing signal to noise ratio and lowering the gyro bias instability.

Figure 2:
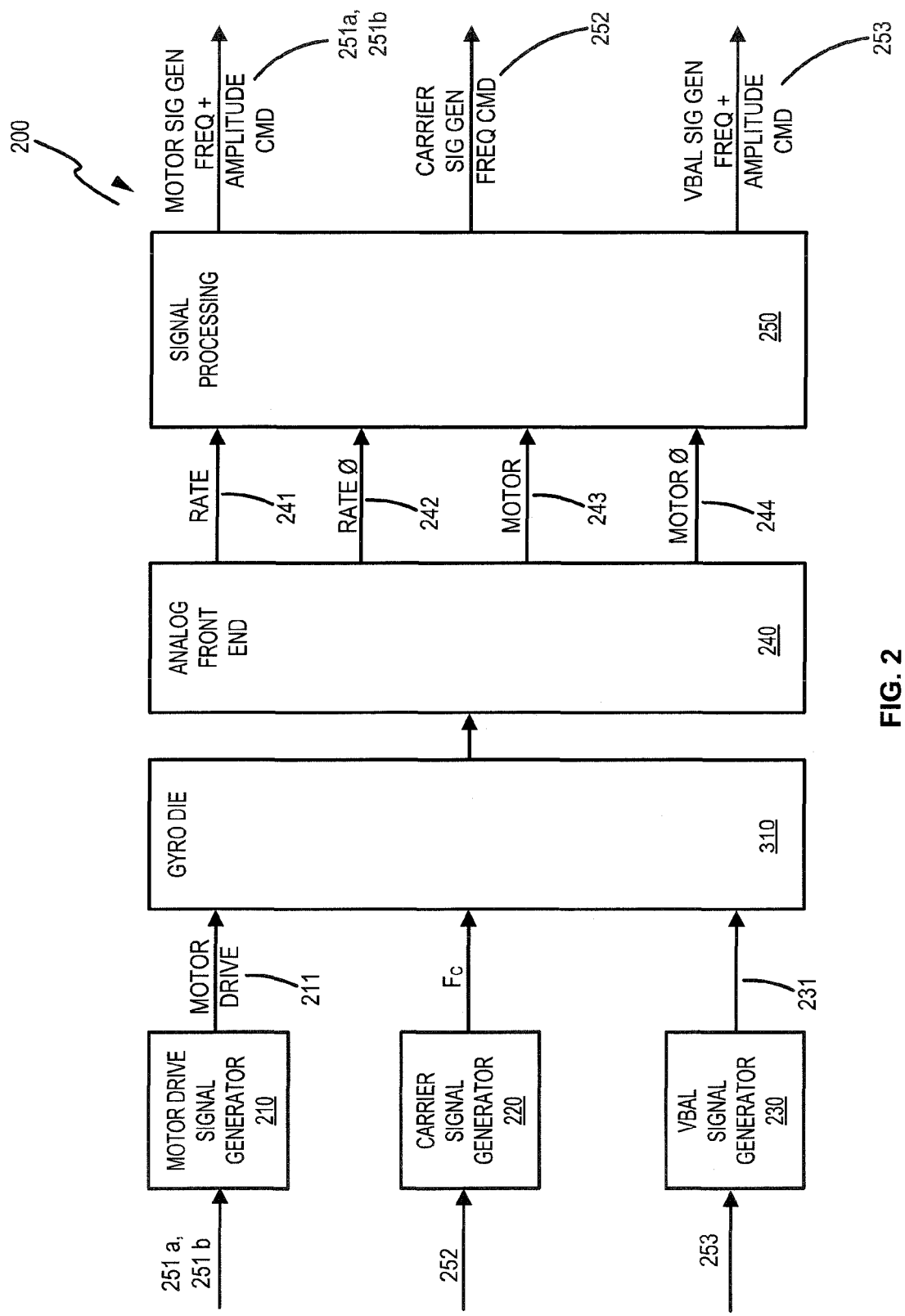
FIG. 2 illustrates a block diagram of an exemplary analog or digital navigation grade gyro in accordance with various embodiments.

In accordance with various embodiments and with reference to FIG. 2, a navigational-grade silicon rate sensor system 200 may comprise a motor drive signal generator 210, a carrier signal generator 220, and a signal compensation generator 230, each in communication with a first circuit 240. In various embodiments, the signal generator modules 210, 220, 230 may be Direct Digital Synthesizers (DDS). A Direct Digital Synthesizer (DDS) is a type of frequency synthesizer used for creating waveforms, such as arbitrary waveforms, from a fixed-frequency reference clock. The navigational-grade rate sensor system 200 further comprises the first circuit 240 in communication with a second circuit 250. The second circuit 250 may be configured to generate the system outputs, and provide feedback signals to the motor module 210, the carrier module 220, and the signal compensation module 230. In a specific embodiment, the second circuit 250 provides feedback signals of a motor drive command 251a, 251b to the motor drive signal generator 210, a rate carrier command 252 to the carrier signal generator 220, and a quadrature rate signal compensation command 253 to the signal compensation generator 230. Moreover, the rate sensor system 200 may provide output signals such as a carrier frequency signal and a rate signal.

Sinusoidal waveforms may be used to minimize high frequency harmonics and reduce the errors created by parasitic capacitors. Signal processing of the in-phase and quadrature portions of the rate signal and components of the motor drive signal result in feedback commands to the three signal generators 210, 220, 230. Signal processing of the in-phase and quadrature portions of the rate signal and components of the motor drive signal result in generation of the commands 251a, 251b, 252, 253. The first circuit 240 may comprise the rate gyro micro structure, an analog rate front end subcircuit and an analog motor front end subcircuit. Signals conveying a rate amplitude 241, rate phase 242, motor amplitude 243, and motor phase 244 may be transmitted from the first circuit 240 to the second circuit 250.

Figure 3:
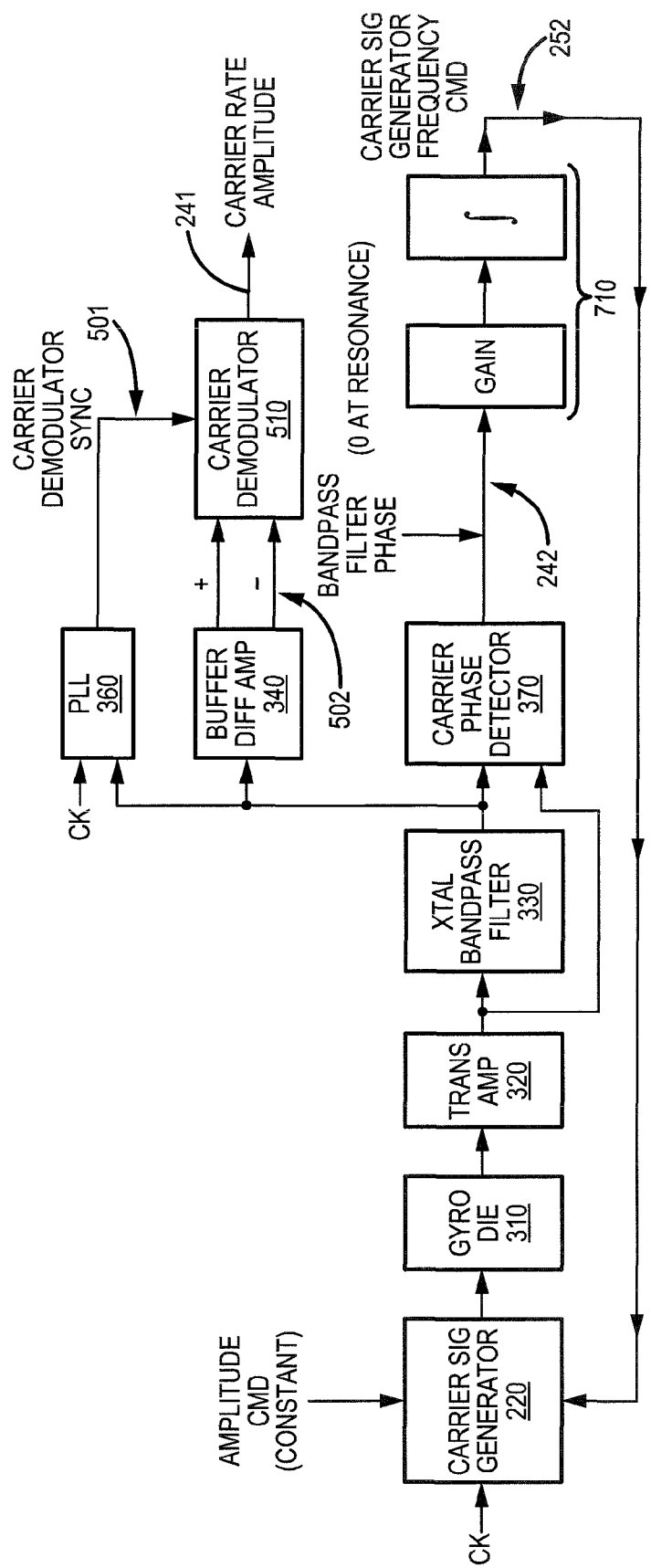
FIG. 3 illustrates a block diagram of an exemplary analog rate front end circuitry and carrier bandpass filter tracking loop that includes a carrier signal generator frequency command source in accordance with various embodiments.

In various embodiments, the first circuit 240 of the navigational-grade silicon rate sensor system 200 may comprise an analog rate front end subcircuit 300 and an analog motor front end subcircuit 400. With reference to FIG. 3, an analog rate front end circuit 300 may comprise a gyro die 310, a transimpedance amplifier 320, and a fixed gain front end crystal bandpass filter 330. The gyro die 310 receives a rate signal, a frequency carrier signal, and a physical motion signal, and generates a representative voltage. The crystal bandpass filter 330 communicates a signal to two separate gain stages, namely a rate amplitude stage and a rate phase stage. The rate amplitude stage includes a differential amplifier 340 in series with a first rate demodulator 510. In various embodiments, the two analog gain stages precede a high performance demodulator. The rate phase path includes a frequency modulation phase detector 370 and a second rate, which outputs the rate phase. The frequency modulation detector 370 determines whether the phase is leading or lagging. In various embodiments, the frequency modulation discriminator 370 may be configured to sample with 90° phase lag at twice the frequency of the rate carrier output frequency present at the input of a second rate A/D converter. A phase lock loop circuit 360 provides a signal for synchronizing the sampling or demodulation of the differential amplifier output.

In accordance with various embodiments, gyro electronics access to the rate signal is implemented with a carrier signal in a high frequency band where low noise content per hertz is available. The current signal from the gyro die 310 may be transformed into a voltage with a very low noise transimpedance amplifier 320 and further amplified with a low noise fixed gain front end crystal bandpass filter 330 followed by a differential amplifier 340.

The analog motor front end circuit may be connected to the gyro die 310, the transimpedance amplifier 420, a motor amplitude stage 401 and a motor phase stage 402. The motor amplitude stage 401 may include a buffer amplifier 440 and a first motor demodulator 603. The motor phase stage 402 may include a frequency modulation discriminator 470. Similar to the rate gain stages, the motor amplitude stage 401 receives and amplifies an analog motor amplitude component signal. The motor phase stage 402 receives a motor phase component signal and determines whether the phase is leading or lagging a reference phase.

The A/D voltage references, all DDS voltage references, and signal voltage references may be all derived from a common voltage reference. Thus, changes to the reference voltage over time are common mode to all the components with negligible effects. Further, signal processing may begin with rapid and accurate measurements to extract low level signals. The signal processing of the motor and rate signals may allow for flexibility, stability, and the dynamic range necessary to achieve navigation grade performance.

In various embodiments, the circuit 250 of the navigational-grade silicon rate sensor system 200 may comprise an in-phase cancellation and rate subcircuit, a motor amplitude and frequency subcircuit, and a carrier frequency subcircuit.

Figure 4:
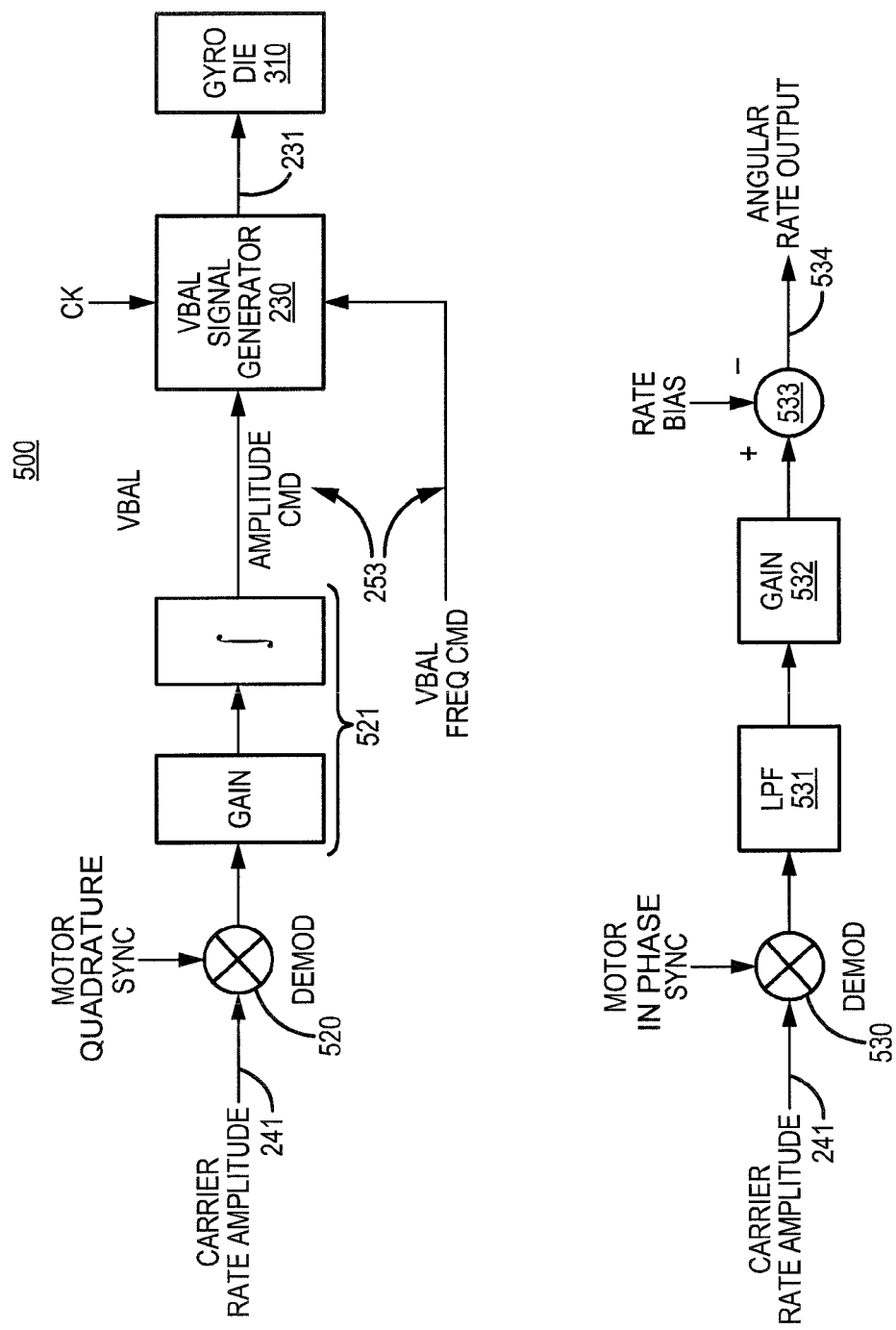
FIG. 4 illustrates block diagrams of exemplary signal processors configured to generate an in-phase cancellation command loop and gyro rate output in accordance with various embodiments.

According to various embodiments and with reference to FIG. 4, signal processing subcircuit 500, which may be a subcircuit of second circuit 250, is depicted. Subcircuit 500 may be configured to generate a quadrature cancellation amplitude command 253 and a gyro rate output signal 534. The quadrature cancellation and rate subcircuit 500 may comprise a carrier demodulator 510 configured to receive a carrier rate phase signal 501 and a carrier amplitude signal 502. The carrier demodulator 510 separates the carrier rate amplitude signal 241 from the high frequency carrier amplitude signal 502. The carrier rate amplitude demodulator 520 separates the quadrature signal from the carrier rate amplitude signal. The quadrature stage 500 determines the magnitude of the quadrature signal. A quadrature signal 231 with the same carrier frequency 253 found at the output of the rate sensor die may be generated (VBAL Frequency Command). The quadrature stage may comprise a carrier rate amplitude demodulator 520, algorithm 521, and VBAL signal generator 230 as depicted in FIG. 4.

The quadrature portion of the carrier rate amplitude signal is utilized to generate a Vbal signal generator amplitude command 253 (quadrature rate signal compensation command). An algorithm 521 accurately estimates the magnitude of the quadrature signal, and commands a VBAL signal generator to generate a quadrature signal with the same carrier frequency found at the output of the rate sensor die 253. The carrier rate amplitude signal is processed to generate a rate output 534. The rate path may include a demodulator 530 separating the In Phase portion with respect to the motor signal from the carrier rate amplitude signal. The quadrature portion of the carrier rate amplitude signal is then passed through a low pass filter 531 and then amplified by amplifier 532. A combiner 533 receives the amplified quadrature portion of the rate signal and removes the constant rate bias, outputting the rate 534.

The quadrature component of the carrier rate amplitude signal is compensated by separating the quadrature data. An algorithm accurately estimates the magnitude of the quadrature signal, and commands a signal generator 230 to generate a quadrature signal with the same carrier frequency found at the output of the rate sensor die 310. This compensation signal estimate is subtracted from the total rate signal increasing signal to noise ratio and lowering the gyro bias instability. The carrier excitation signal frequency 252 may be adjusted with a closed loop so that the rate signal output frequency remains within the bandwidth of the crystal bandpass filter.

Figure 5:
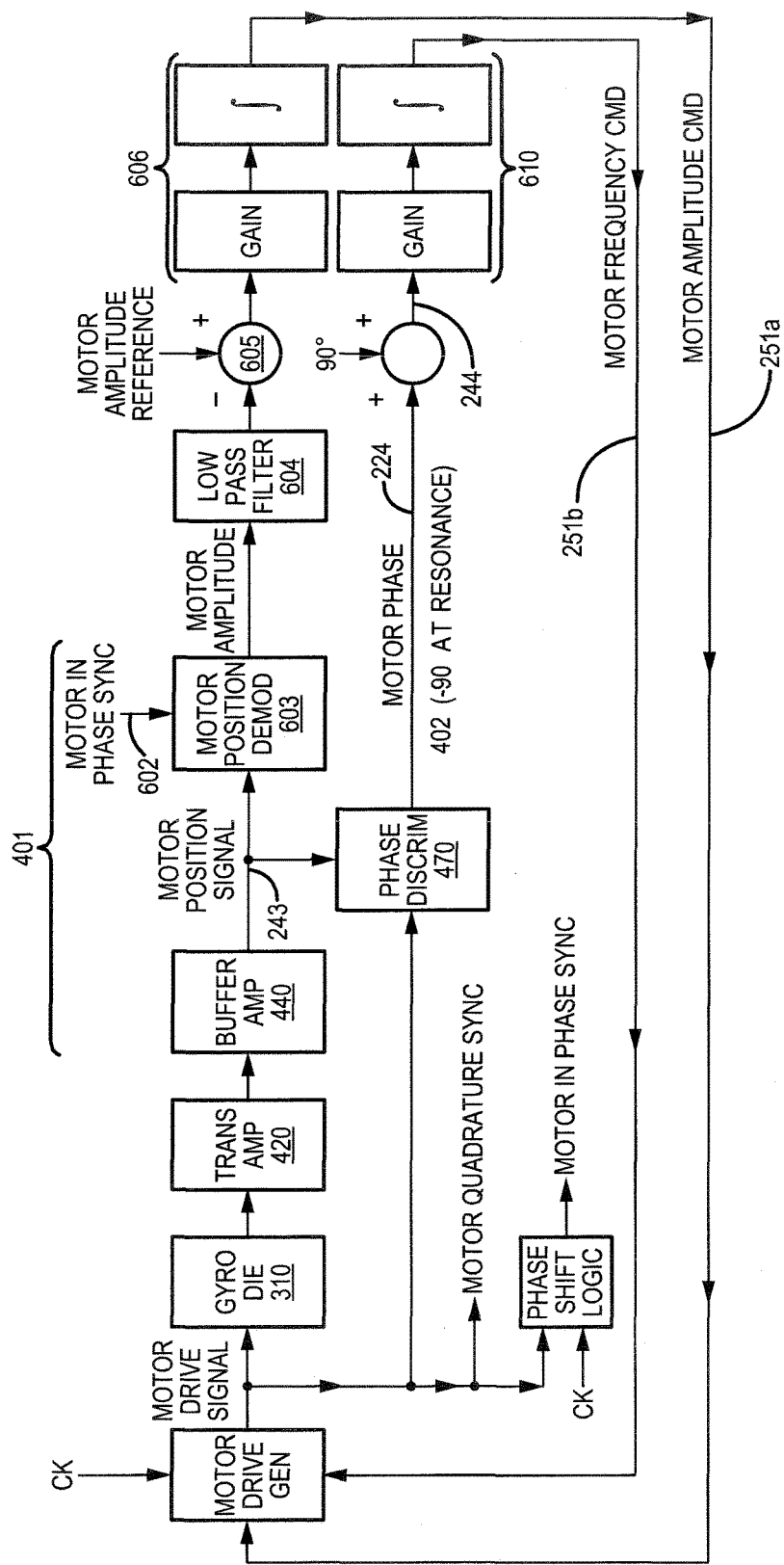
FIG. 5 illustrates a block diagram of an exemplary signal processor configured to generate motor amplitude and frequency commands and analog motor front end circuitry and motor control loop in accordance with various embodiments.

In accordance with various embodiments and with reference to FIG. 5, a motor amplitude and frequency subcircuit may comprise a demodulator 603 configured to combine an in-phase motor signal 602 with the motor amplitude signal 243. The combined signal is input to low pass filter 604. The filtered signal is transmitted to combiner 605. Combiner 605 combines an amplitude reference signal and the filtered signal. The output of the combiner 605 is input to an algorithm 606. The output of algorithm 606 may be motor drive amplitude command 251a. To minimize unwanted phase jitter from the motor and rate pickoff, the motor frequency is locked to a sub harmonic of the crystal time base allowing the phase reference to come from the crystal time base rather than the motor resonance. A commanded motor drive frequency is passed to a motor drive generator that generates the motor drive signals shown in FIG. 5.

In accordance with various embodiments and with continued reference to FIG. 5, a motor amplitude and frequency subcircuit may comprise a motor phase signal 244 delivered to an algorithm or analog circuit 610. The output of the algorithm 610 may be the motor drive frequency command 251b. The commanded motor drive frequency is kept at the motor resonance by adjusting the drive frequency over temperature while selecting a sub harmonic of the crystal time base. The commanded frequency is adjustable in steps of no more than 1.4 µHz which allows the motor to stay at the resonant frequency. Motor resonance is detected with an FM discriminator 470 in the motor position feedback circuit. The discriminator output is used as the feedback to adjust the commanded motor drive frequency. The motor amplitude is kept constant by commanding motor drive signal amplitude to maintain constant device amplitude over temperature with an amplitude closed loop.

With the phase reference originating from the crystal time base, the demodulator phase jitter is eliminated, thus controlling quadrature and cross coupling error effects resulting in much better bias stability. Bias stability is improved because parameters of the quadrature and in-phase signals can be estimated because rate bias variations are a function of these parameters.

Carrier frequency command is generated as a function of the analog electronics crystal filter passband, temperature, and phase from an FM Discriminator applied to the output of the crystal band pass filter to close the carrier tracking loop. The commanded carrier frequency is passed to a signal generator that provides the carrier signal to the sensor die. The total rate signal information is therefore contained within the combination of processed rate data and the commanded frequency to the carrier signal generator as shown in FIG. 3.

According to various embodiments, the configuration of the rate signal analog electronics may be based upon very narrow bandwidth processing and a clean (very low noise) high frequency carrier. The electronics contribution from noise is kept very small as computed by integrating the PSD over a narrow frequency range by limiting the signal bandwidth to less than one Hertz. This is accomplished by computing a commanded carrier frequency as a function of the analog electronics crystal filter pass band, temperature, and phase from an FM Discriminator applied to the output of the crystal band pass filter to close the carrier tracking loop. The commanded carrier frequency is passed to a signal generator that provides the carrier signal to the sensor die.

Phase locking this loop may be utilized to maintain the optimal frequency through the analog crystal pass band filter and to limit the bandwidth of the analog signals to less than one Hertz.

The present disclosure may be applicable in the field of solid state low cost navigation grade rate sensors. These sensors provide low cost high accuracy non GPS navigation, gyro compassing, and precision pointing and stabilization for applications where they are currently excluded due to cost. The concepts disclosed herein may result in a low cost navigation grade and/or low cost high accuracy tactical grade silicon rate sensor. The devices disclosed herein are applicable to new products and low cost retrofits to allow performance enhancements to existing systems. In addition to utilization in vehicles and avionics, alternative uses include precision optical pointing, man carried non GPS navigation, visual odometry aiding, the main steering gyro of a ship and unmanned aerial vehicle navigation and flight.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A navigational-grade rate sensor system for use in an aircraft, comprising:
   a motor module,
   a carrier module,
   a signal compensation module;
   a first circuit in communication with the motor module, the carrier module and the signal compensation module and having:
      a gyro die configured to receive a rate signal from the motor module, a frequency carrier signal from the carrier module and a physical motion signal from the signal compensation module and to generate a current signal,
      a transimpedance amplifier coupled to the gyro die and configured to receive the current signal and to generate a representative voltage,
      a crystal bandpass filter coupled to the transimpedance amplifier and configured to receive the representative voltage and to output a filtered signal,
      a rate amplitude stage coupled to the crystal bandpass filter and configured to receive the filtered signal and to generate a rate amplitude signal, and
      a rate phase stage coupled to the crystal bandpass filter and the transimpedance amplifier and configured to receive the filtered signal and the representative voltage and to generate a rate phase signal, the rate phase stage including a frequency modulation discriminator; and
   a second circuit in signal communication with the first circuit and having a signal processing subcircuit having a carrier demodulator configured to separate in-phase data from total data based on the rate phase signal and the rate amplitude signal, the signal processing subcircuit being configured to generate system outputs and provide feedback signals, including an in-phase cancellation amplitude command and a gyro rate output signal that are based on the rate amplitude signal, to the motor module, the carrier module, and the signal compensation module.

2. The navigational-grade rate sensor system of claim 1, wherein the motor module, the carrier module, and the signal compensation module are signal generators, each including at least one of an analog synthesizer or a Direct Digital Synthesizer (DDS).

3. The navigational-grade rate sensor system of claim 1, wherein the first circuit comprises an analog rate front end subcircuit and an analog motor front end subcircuit.

4. The navigational-grade rate sensor system of claim 1, wherein the first circuit is further configured to generate a motor amplitude signal and a motor phase signal.

5. The navigational-grade rate sensor system of claim 1, wherein the rate amplitude gain stage comprises a differential amplifier coupled in series with at least one of an analog demodulator or a digital demodulator.

6. The navigational-grade rate sensor system of claim 1, wherein the rate phase stage comprises an Analog to Digital converter.

7. The navigational-grade rate sensor system of claim 1, wherein the first circuit further includes a motor amplitude stage and a motor phase stage.

8. The navigational-grade rate sensor system of claim 7, wherein the motor amplitude stage comprises a buffer amplifier and a demodulator that contains an Analog to Digital converter.

9. The navigational-grade rate sensor system of claim 7, wherein the motor phase comprises a frequency modulation discriminator and an Analog to Digital converter.

10. The navigational-grade rate sensor system of claim 1, wherein the signal processing subcircuit further includes at least one of an analog to digital converter or an FPGA subcircuit.

11. A rate sensor system for use in an aircraft, comprising:
   a motor drive signal generator,
   a carrier signal generator,
   a signal compensation generator;

a first circuit in communication with the motor drive signal generator, the carrier signal generator and the signal compensation generator and having:
- a gyro die configured to receive a rate signal from the motor module, a frequency carrier signal from the carrier module and a physical motion signal from the signal compensation module and to generate a current signal,
- a transimpedance amplifier coupled to the gyro die and configured to receive the current signal and to generate a representative voltage,
- a crystal bandpass filter coupled to the transimpedance amplifier and configured to receive the representative voltage and to output a filtered signal,
- a rate amplitude stage coupled to the crystal bandpass filter and configured to receive the filtered signal and to generate a rate amplitude signal, and
- a rate phase stage coupled to the crystal bandpass filter and the transimpedance amplifier and configured to receive the filtered signal and the representative voltage and to generate a rate phase signal, the rate phase stage including a frequency modulation discriminator; and a second circuit in signal communication with the first circuit and having a signal processing subcircuit having a carrier demodulator configured to separate in-phase data from total data based on the rate phase signal and the rate amplitude signal, the signal processing subcircuit being configured to generate system outputs and provide feedback signals, including an in-phase cancellation amplitude command and a gyro rate output signal that are based on the rate amplitude signal, to the motor module, the carrier module, and the signal compensation module.

* * * * *